June 9, 1964 C. PROVOST 3,136,855

AUTOMATIC TELEPHONE DIALING AND TRANSMITTING DEVICE

Filed May 31, 1962

2 Sheets-Sheet 1

INVENTOR
Claude PROVOST
BY [signature]
ATTORNEYS

June 9, 1964 C. PROVOST 3,136,855

AUTOMATIC TELEPHONE DIALING AND TRANSMITTING DEVICE

Filed May 31, 1962 2 Sheets-Sheet 2

INVENTOR
Claude PROVOST
BY
ATTORNEYS 3,136,855
AUTOMATIC TELEPHONE DIALING AND TRANSMITTING DEVICE Claude Provost, 7533 Iberville St., Montreal, Quebec, Canada Filed May 31, 1962, Ser. No. 199,131
7 Claims. (Cl. 179—5)

The present invention relates to a telephone dialing device to be used in conjunction with a standard telephone receiver unit for picking up a signal and transmitting it to a central station or the like.

The invention proposes a device which can be integrated in an alarm system for protecting against burglars and fires and which permits the transmission of a special signal to a central guard station whenever the alarm system is actuated on account of a fire taking place or a burglar attempting to enter the protected premises.

A first object of the invention lies in the provision of a new dialing arrangement which responds to the actuation of an electrical alarm system adapted to operate whenever there is any unauthorized entry of an enclosure, house, safe or the like or whenever a fire detection system is caused to be actuated. Normally, the call sent by this automatic dialing system is received at a police or private guard station or the fire department.

Another object of this invention is to provide a signalling device for transmitting a burglar or a fire alarm over an existing public service line, whereby the location of the burglar or fire may be immediately made known at a central station connected to said public service line.

Another object of the invention lies in the provision of a device for reproducing a coded message and transmitting said coded message upon a telephone receiver.

In accordance with the invention, an automatic dialing and transmitting device is provided which is adapted to be used with a standard telephone and which comprises, a rotatable cycle wheel, a lifting mechanism for raising the telephone receiver off its hook; means on said wheel and rotating therewith for causing actuation of said mechanism during one full revolution of the cycle wheel; a spring loaded device for causing rotation of the telephone dial and allowing its return to rest position; a coded segment on the periphery of said cycle wheel cooperating with the spring loaded device for causing dialing of the telephone according to a predetermined code on the said segment; said actuating means and coded segment on said wheel being so disposed that the raising of the receiver and the dialing thereof take place successively and, finally, further means are provided to transmit an audible signal to the telephone receiver.

Further details of the instant invention will become apparent from the following description having regard to the appended drawings wherein.

Figures 1, 2:
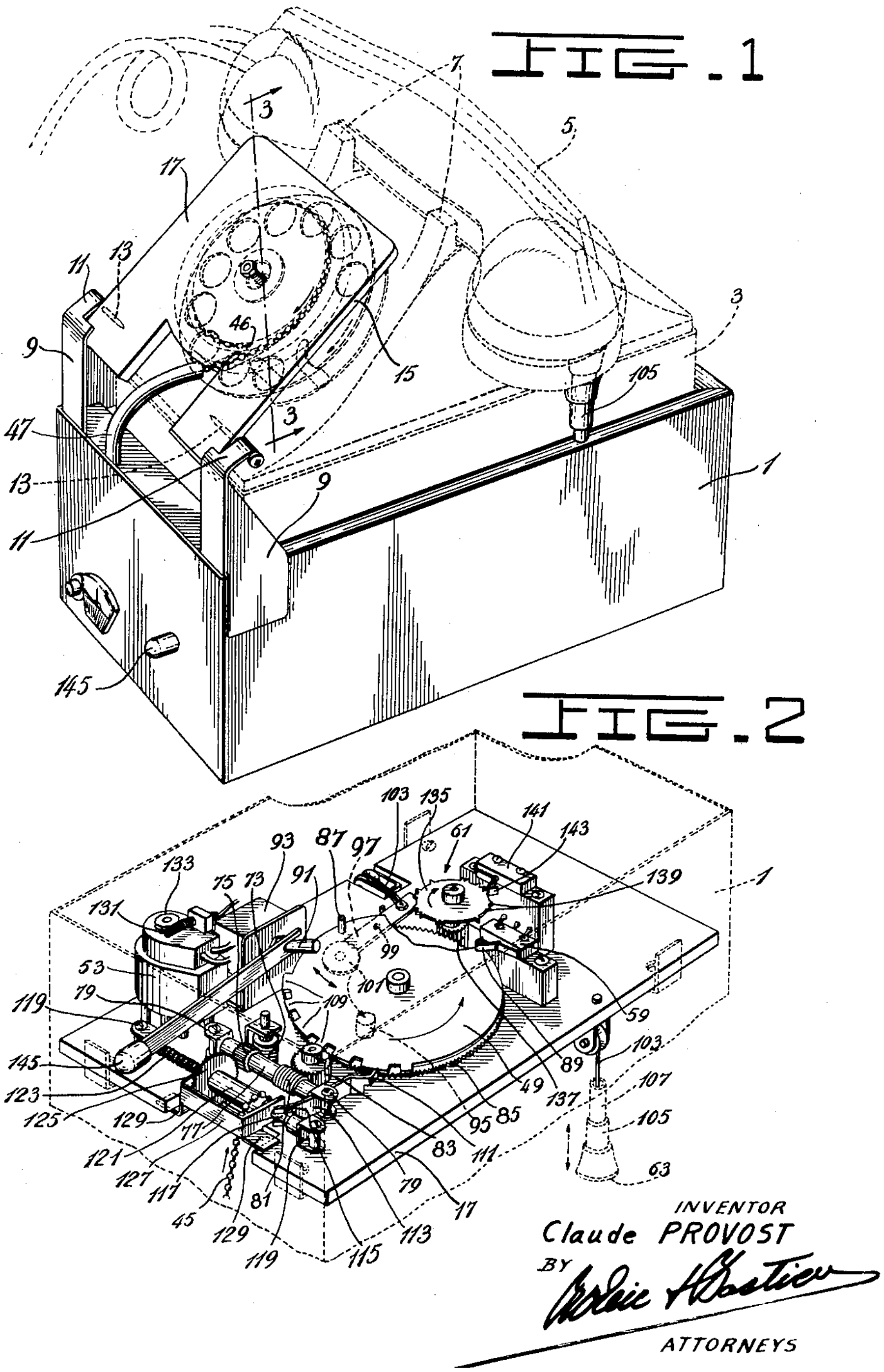
FIGURE 1 is a perspective view of the dialing and transmitting device of the invention, a standard telephone being shown mounted on the device, drawn in dotted lines.
FIGURE 2 is a perspective illustration of the actuating mechanism mounted under the base of the casing of the device.

FIGURE 1 shows a casing 1 within which is housed the signalling device of the invention and over which sits a telephone 3 having a receiver 5 sitting across a hook 7. Two upstanding corner brackets 9 are secured at the front corners of casing 1 and are provided with inwardly turned lugs 11 each of which has suitable means for holding two pivot pins 13 which extend in axial alignment toward one another. Pins 13 are adapted to be received in the lateral edges 15 of a transparent plastic plate 17 in such a manner that the plastic plate 17 may rotate around the axis provided by the coaxial pins.

Figure 3:
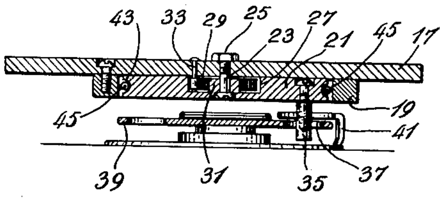
FIGURE 3 is a cross-section view taken along line 3—3 of FIGURE 1.

Beneath plastic plate 17, as shown in FIGURE 3, is secured a ring 19 in which is a rotatable concentric disc 21. This disc may be made rotatable by any known means, such as a central shaft 23 passing through a central circular projection 31 and retaining the disc 21 against plastic plate 17 by means of a nut 25.

An annular groove 27 is provided centrally of disc 21 and concentric with projection 31 for the reception of a leaf spring 29 which is coiled around the central circular projection 31 through which shaft 23 extends. One end of this leaf spring is secured to the circular projection 31 whereas the other end is fixed in relation to the plastic plate 17 as by a retaining riveted member such as 33. Leaf spring 29 becomes a recoil spring which will bring disc 21 back whenever released after having been rotated in a direction reversed that of the spring's action.

A dialing rod 35 is secured eccentrically of and on the surface of disc 21. As shown in FIGURE 3, this dialing rod is intended to project through the zero aperture 37 of a standard telephone dial 39, also provided with the usual finger stop 41.

The outer diameter of disc 21 is substantially smaller than the inner diameter of the ring 19. An arcuate groove 43 is provided at the peripheral edge of disc 21 for the reception of a dialing chain 45, one end 46 of which (FIGURE 1) is secured at one point around the periphery of disc 21. Chain 45 winds around the said disc 21 and comes out at one end to extend through a guiding tube 47 leading into the inner part of casing 1.

It will be understood from the above description that a pull of a predetermined length on chain 45 will actuate the telephone dial 39 a corresponding angular extent. By suitably choosing successive lengths of pull of chain 45, it thus becomes possible to dial a predetermined phone number. The device just described may be termed the dialing mechanism.

Figure 5:
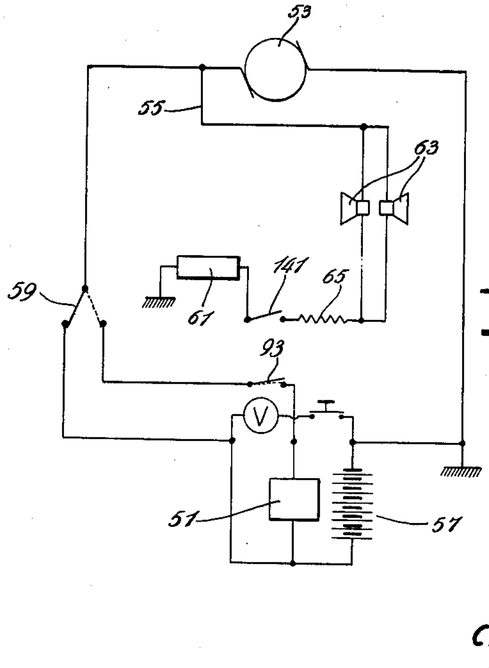
FIGURE 5 is an electrical diagram of the dial and transmitting device.

Turning now to FIGURES 2 and 5, the general principle of the invention may be established.

In FIGURE 5, the dotted positions of the two switches are those of the device when in inactive position.

In that position, alarm circuit 51 which may be a fire alarm or a burglar alarm is connected to a motor 53 and a buzzer circuit generally noted by numeral 55; circuits 53 and 55 being connected in parallel. Actually the buzzer circuit may be any noise producing circuit such as a magnetic tape recording, gramophone recording or the like.

The alarm circuit 51 is connected in series with a power unit 57 which is independent of the power unit of the alarm circuit. A first switch 59 permits to connect the motor and buzzer circuits 53 and 55 to the independent power unit 57 as will be seen later.

The buzzer circuit comprises, in series, a noise making device 61 such as a vibrator, buzzer or the like, a pair of ear phones or similar noise transmitting device and, finally, a resistance 65 to lower the voltage across the ear phones.

Figure 4:
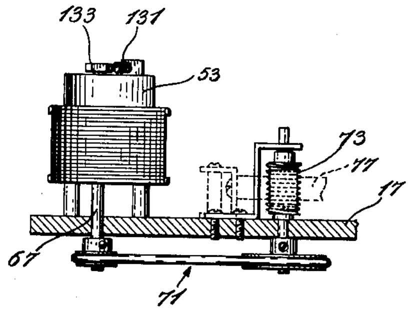
FIGURE 4 is a partial view in cross-section elevation of the motor and power transmitting arrangement, and finally.

Turning now to FIGURE 2 which shows the various mechanisms in actual operation after the device has been operating for a short while, a description of the various means and mechanisms will now be given. The main part of the invention is a central cycle wheel 49 which is placed into rotation by means of motor 53 through a driving connection shown in FIGURE 4. Motor 53 has a driving shaft 67 which extends through the base plate 17 and through a suitable sheave and belt arrangement 71, it drives an upright worm 73 into rotation. The latter meshes with a gear 75 mounted on a horizontal shaft 77 secured against axial displacement on two end brackets 79. Shaft 77 has mounted thereon a second worm 81 which, in turn, meshes with a second gear 83 rotatable around a vertical axis and in turn operatively connected to a toothed wheel 85 secured below the cycle wheel 49 and made integral therewith. By this arrangement, it becomes possible for motor 53 to drive cycle wheel 49 into rotation.

Toothed wheel 85 has, mounted thereon adjacent its periphery, an upstanding pin 87 which, in rest position of the cycle wheel 49, presses on the actuating element 89 of the first switch 59 to return the said switch to the alarm circuit. Pin 87 also serves, after a predetermined angular displacement thereof, to trip off actuating lever 91 of reset switch 93.

A second pin 95 is also mounted adjacent the periphery of cycle wheel 49. This second pin works in conjunction with a lever 97 pivotable, intermediate the ends thereof, around a pivot element 99. The outward end of lever 97 is provided with a wheel 101 engageable by the second pin 95 when the latter reaches the end of its course, that is, after cycle wheel 49 has made a complete rotation and pin 87 again presses on the actuating element 89 of switch 59. The other end of lever 97 is connected to two flexible cables 103 each of which is in turn fixed to an ear phone 105 or the like noise transmitting device. Such ear phones 105 are made to telescope over hollow shafts 107 which are fixed in relation to casing 1. Ear phones 105 are spring loaded upwardly so that in uncompressed state they will lift the receiver 5 off its hook 7. As said previously, the second pin 95 after a complete rotation will press on wheel 101 at the end of lever 97 and force the said lever to pivot clockwise thus withdrawing cables 103 inwardly and lowering the ear phones 105 against their springs.

Around the periphery of cycle wheel 49, a series of outward fingers 109 are formed. It will be noted that the said fingers have different circumferential extents for a purpose to be defined later.

Fingers 109 are for use in conjunction with a projecting ear 111 located at one end of an arm 113 pivotable, substantially centrally thereof, around an axis provided by one of the previously mentioned brackets 79. The other end of arm 113 is formed as a fork 115 engageable around a rod-like support 117 fixed in relation to the base 17 by means of securing bracket 119. A hollow drum 121 is mounted for axial displacement on the said rod-like support 117. It is driven in one direction against one of the brackets 119 by a spring 123. At one end of drum 121 is fixed a geared wheel 125. To provide proper actuating action, a guiding element 127 may be used. Element 127 is U-shaped and has the two legs thereof connected for free slidable movement on the rod-like support 117. It is so mounted on support 117 as to house within its two legs the hollow drum 121 and the geared wheel 125 so that spring 123 actually abuts the outer face of one of its legs and fork 115 abuts the outer face of the other of its legs. Outward lateral extensions 129 are used to guide the said element by sliding on the two faces of the base plate 17. The free end of chain 45 is fixed to this hollow drum 121 so as to be wound thereon.

A noise making device may simply be a loose coil spring 131 mounted on motor 53 so as to come in actual contact with an hexagonal nut 133 fixed at the end of the motor shaft. Coil spring 131 is made part of the buzzer or noise making circuit 55 and is able to constantly produce a buzzing noise whenever motor 53 is in operation.

The noise produced by coil spring 131 or any other suitable noise may be used to provide a coded signal which is transmitted to the ear phones and subsequently to the telephone receiver. It should be noted at this time that by providing two ear phones 105, regardless of how the telephone receiver sits on the hook, the message will always be relayed.

The means suggested for sending the coded signal is as follows.

A coded wheel 135 is mounted for rotation on a common shaft to a gear 137 mesting with the toothed wheel 85 of the cycle wheel 49. This coded wheel 135 is therefore in rotation for as long a period as that of wheel 49. Around the periphery of coded wheel 135 are provided a series of radial points 139 adapted to open and close a signal switch 141 (see FIGURES 2 and 5) to thus produce intermittent transmissions of noise to the ear phones 63. The actuation of signal switch 141 by points 139 may be obtained by a flexible lever 143 or the like.

It will thus be seen that by suitably arranging and distributing the radial points 139 on the periphery of the toothed wheel 135, it is possible to cause actuation of the buzzer circuit to produce a definite coded signal in the ear phones 63.

A complete description of the operation of the device of the invention will now be given.

As mentioned previously, in inoperative position of the device, pin 87 presses on actuating element 89 to locate the switch 59 in the dotted line position of FIGURE 5. In that position, the motor and the buzzer circuit are in the alarm circuit. Also, wheel 101 of lever 97 is pushed outwardly by second pin 95 so that the ear phones 105 are in retracted position. Whenever the alarm system is actuated by unauthorized entry of the protected premises or by a fire, the motor 53 starts running, cycle wheel 49 starts turning and pin 87 releases actuating element 89 so that the switch 59 moves to the position shown in full line in FIGURE 5, that is, in the device's own power circuit which includes the power unit 57. It will thus be understood that whatever happens to the alarm circuit thereafter will not affect the rotation of cycle wheel 49 since it is now connected to its own power.

Immediately from the start also, second pin 95 releases lever 97 which, due to the spring action of ear phones 105, rotates counterclockwise and ear phones 105 move upwardly to raise receiver 5 off its hook 7. At the same time, ear phones 105 are in a position to transmit the coded message produced by the noise making device.

After having gone through a partial rotation of the wheel 49, pin 87 trips off lever 91 of reset switch 93. As will be seen in FIGURE 5 this will not affect the operation of the signalling device but it means that the reset switch has to be closed before a second operation of the device. This is done by means of push button 145.

Spring 123 on rod-like support 117 forces arm 113 to pivot in a counterclockwise rotation so as to press ear 111 constantly against the periphery of cycle wheel 49. This also means that as the first of the fingers 109 at the periphery of wheel 49 engages ear 111, it will force arm 113 to pivot clockwise thus moving hollow drum 121 to the left as seen in FIGURE 2. This is done through the forked end 115 of arm 113. At the same time, geared wheel 125 at one end of hollow drum 121 becomes in meshing engagement with the rotating gear 75 of horizontal shaft 77 itself brought in rotation by motor 53. As soon as toothed wheel 125 engages gear 75, the hollow drum 121 starts rotating and chain 45 winds around it, bringing disc 21 and telephone dial 39 into rotation. The actual extent of the rotation of dial 39 will depend on the circumferential length of the finger 109 involved. When gear 111 reaches a void between two successive fingers 109, spring 123 will push drum 121 to the right and disengage toothed wheel 125 from gear 75 thus freeing drum 21 and allowing it to unwind under the action of the recoil spring 29 located in the central groove 27 of disc 21 (see FIGURE 3). Successive fingers 109 with predetermined peripheral length may thus be provided that will allow the dialing of a particular number corresponding to the telephone number of the central station servicing the protected area or to the fire department.

It should be remembered that all that time, the coded wheel 135 which rotates much faster than cycle wheel 49 sends out its message in the ear phones 105 so that as soon as the telephone receiver at the other end of the line is picked up, the message may be heard and the location of the troubled area thus obtained.

By suitably selecting the relative sizes of cycle wheel 49 and coded wheel 135, it is possible to have the signalling device operate for as long a time as required.

Although a specific embodiment of the invention has just been described, it will be understood that many modifications may be made thereto without departing from the spirit of the invention.

The embodiments of the invention in which an exclusive property or privilege is claimed are defined as follows:

1. An automatic telephone dialing and transmitting apparatus, comprising:

(*a*) a cycle wheel rotatable at constant speed and having a coded peripheral segment formed of a series of notches cut along the segment defining, therebetween, a plurality of fingers distributed, along said segment, in accordance with a predetermined code;

(*b*) a rotatable power shaft;

(*c*) an axially displaceable drum parallel to said power shaft;

(*d*) resilient means pressing said drum axially in one direction;

(*e*) cooperating clutch parts, on said shaft and drum, normally out of mutual engagement by the action of said resilient means and adapted, when in engagement, to cause rotation of the drum;

(*f*) a rotatable recoiling disc having a dial operating finger projecting from the surface thereof and adapted to engage a finger hole in a telephone dial;

(*g*) a flexible cable connected, at one end, on said drum for winding therearound, and at the other end to the periphery of said disc for also winding therearound, in such a way that in operation of said apparatus said cable winds on said drum as it unwinds from said disc, and vice-versa, thus causing rotation of said telephone dial;

(*h*) an operating arm pivotable intermediate the ends thereof and in contact, at the ends, simultaneously with the periphery of said cycle wheel and said drum in such a manner that when the relevant end of said arm moves from a groove and rides over one of said fingers, said drum moves against said resilient means to force the clutch parts in mutual engagement, the drum rotates and the flexible cable unwinds from said disc and winds on said drum against the recoil action of said disc to dial a number and when said relevant end drops into a notch, the drum is forced in opposite direction by said resilient means, the clutch parts fall out of engagement and the flexible cable unwinds from said drum to wind on said disc under the recoil action thereof.

2. An apparatus as claimed in claim 1 further including:

a telephone receiver lifting mechanism including axially movable shafts spring urged upwardly to operative position whereby to lift the receiver off its hook and to bear against the mouth and ear pieces thereof;

an element on said rotatable cycle wheel engageable with said lifting mechanism to retract said shafts from operation position after a complete revolution of said cycle wheel;

an electrical signalling circuit, including continuous noise making means, for transmitting an audible signal to said telephone receiver;

a signal transmitting member, in said circuit, mounted on each shaft and coded switch means, operable by said cycle wheel for opening and closing said signalling circuit and noise making means to thereby allow transmission of a coded noise by said transmitting members.

3. An apparatus as claimed in claim 2, wherein said lifting mechanism further comprises:

(*k*) a lever pivotable intermediate the ends thereof and adjacent said cycle wheel;

(*l*) flexible cables connected to one end of said lever and to each of said movable shafts;

(*m*) a protruding member at the other end of said lever, and wherein said lifting mechanism engageable element is a pin projecting from said cycle wheel in the direction of said protruding member whereby said pin engages said protruding member, to retract said shafts through said flexible cables, once per revolution.

4. An apparatus as claimed in claim 2, wherein said switch means comprises:

(*k''*) a coded wheel coupled to said cycle wheel for rotation therewith;

(*l''*) a series of points projecting from the periphery of said coded wheel and disposed in accordance with a determined code;

(*m''*) a switch in said signalling circuit having an operating lever in engagement with said coded wheel, whereby rotation of said coded wheel will bring said lever successively in contact with said points to actuate said switch and open and close said circuit in accordance with the code on the coded wheel.

5. An apparatus as claimed in claim 2, wherein said element and said coded segment are so disposed on said cycle wheel that the lifting of the receiver and the dialing take place successively.

6. An apparatus as claimed in claim 1, (*k'''*) a second pin at the periphery of said cycle wheel;

(*l'''*) a motor circuit having a motor for driving said power shaft and cycle wheel;

(*m'''*) a power circuit;

(*n'''*) an alarm circuit;

(*o*) a double pole switch, connecting said motor power and alarm circuits, adapted to selectively join said motor circuit to said power circuit and to said alarm circuit; and, (*p*) an actuating lever for said double pole switch in proximity of said cycle wheel and engageable by said second pin to provide the selection described in (*o*).

7. An apparatus as claimed in claim 6, a reset switch in said motor circuit having an actuating lever in proximity of said cycle wheel and engageable by second pin to cut the motor circuit off; said second pin engaging said double pole and reset switches successively.

References Cited in the file of this patent

UNITED STATES PATENTS

| | | |
|---|---|---|
| 2,830,119 | Zimmerman | Apr. 8, 1958 |
| 2,866,850 | Duca et al. | Dec. 30, 1958 |
| 2,907,828 | Tegeler | Oct. 6, 1959 |
| 2,952,740 | Montrose | Sept. 30, 1960 |